United States Patent
Kupferstein (10) Patent No.: US 9,678,537 B2
(45) Date of Patent: Jun. 13, 2017

(54) MOBILE DEVICE CASE AND PERIPHERAL SYSTEM

(71) Applicant: Victor Kupferstein, Brooklyn, NY (US)

(72) Inventor: Victor Kupferstein, Brooklyn, NY (US)

( * ) Notice: Subject to any disclaimer, the term of this patent is extended or adjusted under 35 U.S.C. 154(b) by 0 days.

(21) Appl. No.: 14/266,747

(22) Filed: Apr. 30, 2014

(65) Prior Publication Data

US 2014/0321048 A1 Oct. 30, 2014

Related U.S. Application Data

(60) Provisional application No. 61/817,383, filed on Apr. 30, 2013.

(51) Int. Cl.
*G06F 1/16* (2006.01)
*H04M 1/02* (2006.01)
*G06F 1/18* (2006.01)
*F16M 11/40* (2006.01)
*F16M 13/02* (2006.01)

(52) U.S. Cl.
CPC ........... *G06F 1/1632* (2013.01); *F16M 11/40* (2013.01); *F16M 13/022* (2013.01); *G06F 1/1635* (2013.01); *G06F 1/1656* (2013.01)

(58) Field of Classification Search
CPC .... F16M 11/40; F16M 13/022; G06F 1/1632; G06F 1/1635; G06F 1/1656
See application file for complete search history.

(56) References Cited

U.S. PATENT DOCUMENTS

| 5,586,002 A * | 12/1996 | Notarianni | G06F 1/1626 248/920 |
| 6,790,094 B1 * | 9/2004 | Bergmann | G09G 5/006 439/653 |
| 6,952,343 B2 * | 10/2005 | Sato | G06F 1/1632 361/679.57 |

(Continued)

FOREIGN PATENT DOCUMENTS

| CN | 203119980 U | 8/2013 |
| CN | 103561139 A | 2/2014 |
| KR | 20110040622 A | 4/2011 |

OTHER PUBLICATIONS

Sharplines Products, E-Fusion, https://www.indiegogo.com/projects/e-fusion-keep-your-phone-charged-all-day?browse_v=new#home, accessed Apr. 30, 2014.

(Continued)

*Primary Examiner* — Xanthia C Cunningham
(74) *Attorney, Agent, or Firm* — Myers Wolin, LLC (57) ABSTRACT

A mobile device case having a first port and a second port, both for interfacing with a mobile device and a third port electrically connected to both the first port and the second port, the third port for interfacing with a peripheral. In one embodiment, the first port may be for power and the second port may be for data, and the third port may be a circular port having rings of conductive material electrically connected to either the first port or the second port. In one embodiment, the third port may further be recessed into a back surface of the case, and walls of the recessed segment may be used as a portion of a support system for removably fixing peripherals to the third port.

34 Claims, 9 Drawing Sheets

(56) References Cited

U.S. PATENT DOCUMENTS

| | | | |
|---|---|---|---|
| 7,658,613 B1* | 2/2010 | Griffin | H01R 13/6205 439/39 |
| 7,683,572 B2* | 3/2010 | Toya | H02J 7/0044 320/108 |
| 7,855,529 B2* | 12/2010 | Liu | G06F 1/1632 320/108 |
| 7,963,774 B2* | 6/2011 | Shiff | H01R 13/6205 439/38 |
| 8,390,255 B1* | 3/2013 | Fathollahi | H02J 7/0045 206/308.3 |
| 8,398,409 B2* | 3/2013 | Schmidt | H01R 11/30 439/39 |
| 8,422,208 B2* | 4/2013 | Wang | F16M 11/10 345/156 |
| 8,553,408 B2* | 10/2013 | Supran | G06F 1/1632 361/679.02 |
| 8,629,654 B2 | 1/2014 | Partovi et al. | |
| 8,688,037 B2 | 4/2014 | Chatterjee et al. | |
| 8,729,854 B2* | 5/2014 | Tsai | H02J 5/005 320/108 |
| 8,755,851 B2* | 6/2014 | Kim | H04M 1/0274 455/572 |
| 8,761,432 B1* | 6/2014 | Cheng | H04R 1/026 381/338 |
| 8,891,800 B1* | 11/2014 | Shaffer | H04R 1/1025 379/437 |
| 8,894,419 B1* | 11/2014 | Buelow | H01R 13/6205 439/218 |
| 8,918,548 B2* | 12/2014 | Wang | G06F 1/1626 361/679.56 |
| 8,922,354 B2* | 12/2014 | Nagara | G06F 1/1632 340/4.12 |
| 8,964,372 B2* | 2/2015 | Morton | G06F 1/1632 361/679.4 |
| 9,062,695 B2* | 6/2015 | Witter | H01R 13/6205 |
| 9,088,097 B2* | 7/2015 | Kim | H01R 13/6205 |
| 9,288,295 B2* | 3/2016 | Ivanovski | H04B 1/3816 |
| 2003/0236102 A1* | 12/2003 | Kawai | G06F 1/1626 455/550.1 |
| 2005/0085278 A1* | 4/2005 | Lin | H04M 1/72527 455/573 |
| 2005/0174727 A1* | 8/2005 | Thomas | G06F 1/1626 361/679.56 |
| 2005/0213300 A1* | 9/2005 | Tran | G06F 1/181 361/679.4 |
| 2006/0101176 A1* | 5/2006 | Eric | G06F 1/1613 710/62 |
| 2006/0221565 A1* | 10/2006 | Doherty | G06F 1/1632 361/679.41 |
| 2007/0072442 A1* | 3/2007 | DiFonzo | H01R 13/641 439/39 |
| 2008/0068816 A1* | 3/2008 | Han | H01R 11/30 361/760 |
| 2009/0020672 A1* | 1/2009 | Lai | F16M 13/00 248/274.1 |
| 2009/0168327 A1* | 7/2009 | Chang | G06F 1/1632 361/679.43 |
| 2010/0081377 A1* | 4/2010 | Chatterjee | G06F 1/1632 455/41.1 |
| 2010/0093412 A1* | 4/2010 | Serra | H04B 1/3888 455/575.8 |
| 2010/0131691 A1* | 5/2010 | Chatterjee | G06F 1/26 710/303 |
| 2010/0146308 A1* | 6/2010 | Gioscia | G06F 1/1632 713/300 |
| 2011/0050164 A1 | 3/2011 | Partovi et al. | |
| 2011/0170256 A1* | 7/2011 | Lee | G04G 17/086 361/679.44 |
| 2011/0170724 A1* | 7/2011 | Lin | B65H 75/48 381/332 |
| 2011/0199041 A1* | 8/2011 | Yang | H01M 10/46 320/101 |
| 2011/0242754 A1* | 10/2011 | Morton | G06F 1/1632 361/679.41 |
| 2012/0154991 A1* | 6/2012 | Lei | H04M 1/0262 361/679.01 |
| 2012/0202427 A1* | 8/2012 | Gioscia | G06F 1/1632 455/41.2 |
| 2012/0206090 A1* | 8/2012 | Hyun-Jun | H02J 7/025 320/107 |
| 2012/0254479 A1 | 10/2012 | Matsuoka | |
| 2012/0279516 A1* | 11/2012 | Bouix | A45D 33/008 132/301 |
| 2012/0329532 A1* | 12/2012 | Ko | H04B 1/3888 455/573 |
| 2013/0058023 A1* | 3/2013 | Supran | G06F 1/1632 361/679.01 |
| 2013/0143419 A1* | 6/2013 | Wei | G06F 1/1626 439/39 |
| 2013/0150134 A1* | 6/2013 | Pliner | H02J 7/0042 455/573 |
| 2013/0182387 A1 | 7/2013 | Mere et al. | |
| 2014/0003647 A1* | 1/2014 | Liu | H04R 1/026 381/386 |
| 2014/0021909 A1 | 1/2014 | Klawon et al. | |
| 2014/0192481 A1* | 7/2014 | Wojcik | H05K 5/0086 361/679.55 |
| 2014/0265765 A1* | 9/2014 | Khodapanah | F16M 13/02 312/223.1 |
| 2014/0323064 A1* | 10/2014 | McCarthy | H04B 1/40 455/77 |
| 2014/0363988 A1* | 12/2014 | An | G06F 1/1632 439/39 |

OTHER PUBLICATIONS

BuQu Tech, BuQu Tech Magnetyze Car Charging Stand, Desk Charging Stand + Magnetic Wall Charger, http://www.ilounge.com/index.php/reviews/entry/buqu-tech-magnetyze-car-charging-stand-desk-charging-stand-magnetic-wall-ch/, accessed Apr. 30, 2014.

Pearce, Nokia Lumia 1020 wireless charging case and camera grip case—Review, http://www.coolsmartphone.com/2013/11/28/nokia-lumia-1020-wireless-charging-case-and-camera-grip-case-review/#shadowbox[cleaner-gallery-1]/5/, accessed Apr. 30, 2014.

Snap!, Snap!, https://www.indiegogo.com/projects/snap--2#home, accessed Apr. 30, 2014.

Google, Nexus 4 Wireless Charger, https://play.google.com/store/devices/details/Nexus_4_Wireless_Charger?id=nexus_4_wireless_charger, accessed Apr. 30, 2014.

* cited by examiner

MOBILE DEVICE CASE AND PERIPHERAL SYSTEM

CROSS REFERENCE TO RELATED APPLICATION

This present application is a continuation of U.S. Provisional Patent Application 61/817,383, filed Apr. 30, 2013, the entire contents of which is incorporated herein by reference.

FIELD OF THE INVENTION

The invention relates to the field of electronic accessories for mobile devices, and more specifically to a case and peripheral system for mobile devices, including phones, tablet computers and the like.

BACKGROUND

Smartphones and tablet computers have gained tremendous popularity and widespread adoption among users across the globe. For example, Apple's iPhone as well as many other smartphones which run Google's Android software have become increasingly popular. Tablet computers also are becoming widely used by consumers. Popular tablet computers include Apple's iPad, Samsung's Galaxy and Lenovo's Thinkpad Tablet. Tablet computer use has been growing among all segments of the population.

Smartphone and tablet users often need to recharge the batteries on their devices—especially when they are used for viewing video content and the like. Many mobile device users also desire a dock or similar mount for holding a device for ease of view.

SUMMARY

There is provided a mobile device case having a first port and a second port, both for interfacing with a mobile device and a third port electrically connected to both the first port and the second port, the third port for interfacing with a peripheral. The first port may be for power and the second port may be for data, and the third port may be a circular port having rings of conductive material electrically connected to either the first port or the second port. The third port may further be recessed into a back surface of the case, and walls of the recessed segment may be used as a portion of a support system for removably fixing peripherals to the third port.

There is further provided a mobile device case system for fixing peripheral devices to the case, the system having a mobile device case and a peripheral. The peripheral may be a charging stand, a charging mount, a standalone charger, a hard drive, a spare battery, a speaker, or any other number of alternative peripherals.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

DETAILED DESCRIPTION OF THE PREFERRED EMBODIMENTS

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the exemplified embodiments. Accordingly, the invention expressly should not be limited to such exemplary embodiments illustrating some possible non-limiting combination of features that may exist alone or in other combinations of features; the scope of the invention being defined by the claims appended hereto.

It is further noted that the term "mobile device" herein broadly refers to any of various mobile phones, tablet computers, a GPS device, an eBook reader or such similar devices. Any specific devices mentioned herein are exemplary in nature and the invention is not limited to the particular devices mentioned.

This disclosure describes the best mode or modes of practicing the invention as presently contemplated. This description is not intended to be understood in a limiting sense, but provides an example of the invention presented solely for illustrative purposes by reference to the accompanying drawings to advise one of ordinary skill in the art of the advantages and construction of the invention. In the various views of the drawings, like reference characters designate like or similar parts.

Figure 1:
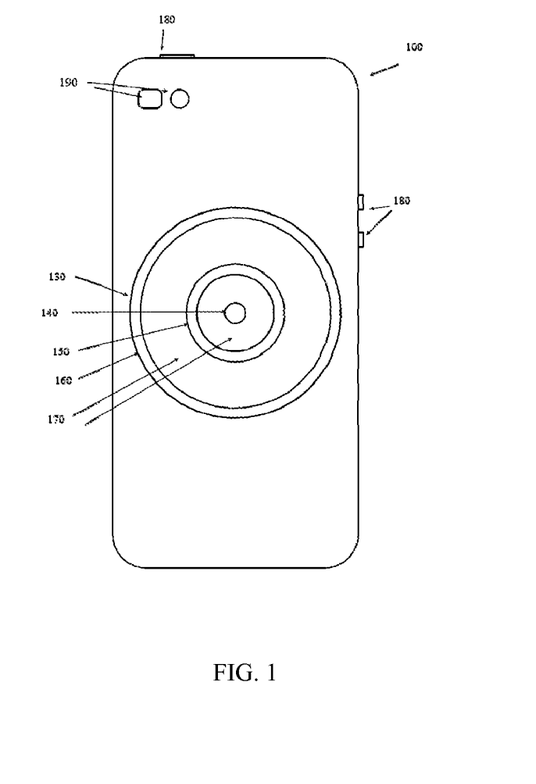
FIG. 1 is a rear view of a mobile device case.
Figure 2:
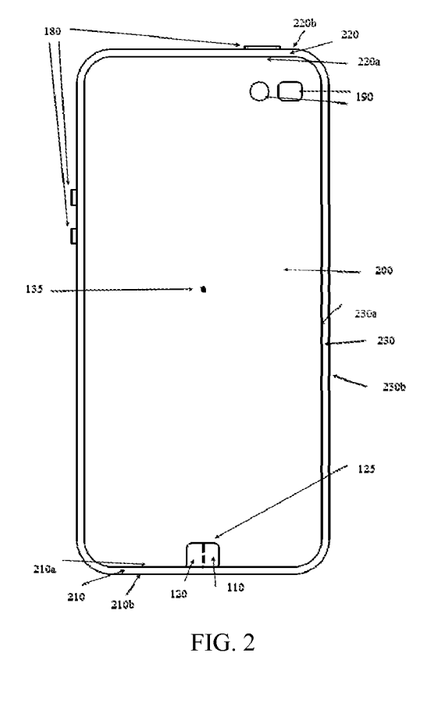
FIG. 2 shows a front view of the case of FIG. 1.

FIG. 1 shows a rear view of a mobile device case 100, and FIG. 2 shows a front view of the case. The case 100 contains a first port 110 and a second port 120 for interfacing with a mobile device placed within the case, and a third port 130 connected to the first port 110 and the second port 120 within the case. The third port 130 interfaces with peripheral devices usable in conjunction with the case 100. In the figure, the first port 110 is for transmitting and receiving power and the second port 120 is for transmitting and receiving data. The first port 110 and the second port 120 may share a housing 125 while containing distinct contacts for interfacing with corresponding ports of a mobile device placed within the case.

The third port 130 provides a combination of the first port and the second port in a combined interface for connecting with peripherals. Generally, the port will contain the one conductive segment more than there are ports for interfacing with the mobile device. Accordingly, the third port comprises a first conductive segment 140, a second conductive segment 150, and a third conductive segment 160. The first conductive segment 140 acts as a grounded contact or a "low" power level, and the second conductive segment 150 is for transmitting and receiving power, or acting as a "high" power level. The first and second conductive segments 140, 150 are electrically connected to the first port 110 and combine to replicate the function of the first port 110. The third conductive segment 160 is for transmitting and receiving data, and is electrically connected to the second port 120. The electrical connection may be through wires or other conducting materials within the body of the case 100. In between the first and second conductive segments 140, 150 and the second and third conductive segments 150, 160, are insulating bands 170. The insulating bands 170 separate the conductive segments 140, 150, and 160 from each other to avoid a short circuit across the contacts.

A fourth port (not shown) may be provided in addition to the first port 110 and the second port 120, where the fourth port carries audio signals. In such an embodiment, the third port 130 may contain 4 conductive segments. Alternatively, the first port 110 and the second port 120 may be configured to carry power and audio signals rather than power and data. For example, the first port 110 may be a power connection and the second port 120 may be a headphone or audio jack or a data connection.

In addition to the ports, the case 100 further contains buttons 180 for contacting assorted corresponding buttons on a mobile device contained in the case, such as volume buttons and power buttons. The case further contains gaps 190 for accessing features of a mobile device in the case, such as a camera lens and flash.

When viewed from the front, the case has a back wall 200, a bottom wall 210, a top wall 220, and two side walls 230. Each of the walls 210, 220, 230 has an inner surface 210a, 220a, 230a constructed to match the size and shape of a particular mobile device, and to contact corresponding surfaces on the mobile device. The bottom inner wall 210a contains the first port 110 and the second port 120, located to match corresponding ports on the mobile device. In the embodiment shown, the first port 110 and the second port 120 share a housing 125 in order to properly interface with corresponding ports of the mobile device. In cases configured for alternate mobile devices, the first port and the second port may be next to each other, or they may be on separate sides of the case. The first port 110 may be on the bottom inner wall 210a of the case 100 while the second port 120 may be on the inner side wall 230a of the case, or otherwise oriented differently from each other and from the third port. As shown, the first port 110 and the second port 120 are orthogonal to an axis 135 of the third port 130.

The case 100 may contain additional ports on a portion of the outer wall 210b, 220b, 230b, corresponding to the first port 110 and second port 120. A port duplicating the first port 110 may be placed on a portion of the outer bottom wall 210b corresponding to the location of and in electrical connection with the first port. Accordingly, in addition to the third port allowing for connections to peripheral devices, peripherals designed for use with the particular mobile device in the case may still be used with the device.

The case 100 may be a minimal framework so long as it includes the first port 110, the second port 120, and the third port 130. Further, the case 100 may be a replacement for a back surface of a phone, or it may be the back surface of the phone itself. In the alternative, the case may be external to the phone, and it may be designed to provide protection to the phone.

Figure 3:
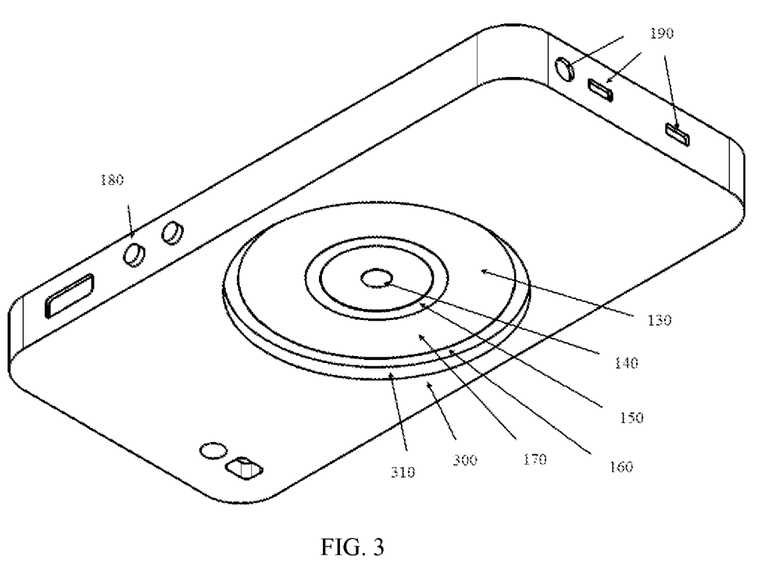
FIG. 3 is a perspective view of the case of FIG. 1.

FIG. 3 is a perspective view of the case 100 of FIG. 1. The third port 130 is a circular disc recessed into a back surface 300 of the case 100, and contains a circular outer wall 310 connecting an inner surface of the third port having the conductive segments 140, 150, 160 and the insulating bands 170 to the back surface of the case. The circular outer wall 310 is configured to mate with peripherals for use with the case 100, which may be secured to the third port 130 such that at least one electrical contact located on the peripheral lines up with at least one of the conductive segments 140, 150, 160.

In the embodiment shown, the third port 130 is a recessed disc, and the circular outer wall 310 acts to secure peripherals using, for example, a press fit connection, a magnetic connection, a threaded engagement, a twist lock, a snap, a hook, Velcro, or any other male-female connection. In some of these connections the case may be rotatable about an axis of the third port 130. In other embodiments, the third port 130 may be a shape other than circular, and it may secure a peripheral without the use of an outer wall 310. In some embodiments, a peripheral secured in the third port 130 may be rotatable within the third port 130.

Figure 4:
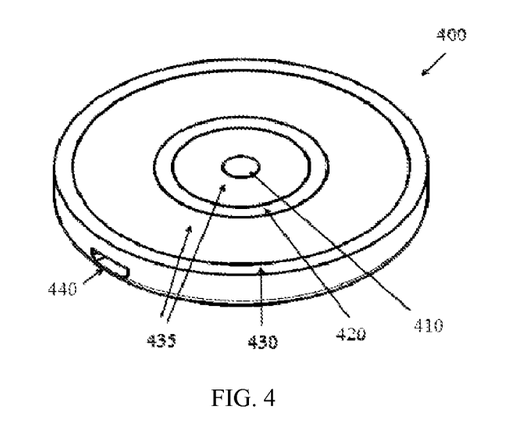
FIG. 4 is a perspective view of a battery peripheral for use with the case of FIG. 1.

FIG. 4 shows a perspective view of a battery peripheral 400 for securing to the third port 130 of the case. The battery peripheral 400 provides an extended life battery that may be placed in electrical communication with two of the conductive segments 140, 150, 160 at conductive segments 410, 420, and 430 on the front surface. In some embodiments, only two conductive segments 410, 420, and 430 are connected to a battery in the battery peripheral, and they communicate with power and ground contacts for either providing power to a mobile device in the case 100 directly or for charging a battery in the mobile device. Between the conductive segments are insulating segments 435. The battery peripheral 400 therefore provides power to the first port 110 through the two conductive segments of 410, 420, and 430.

The battery peripheral 400 may contain a charging port 440 for charging the battery when not secured to the case. This port 440 may allow the battery peripheral 400 to charge when not in use by connecting to a charging cable using a standard interface.

Figure 5:
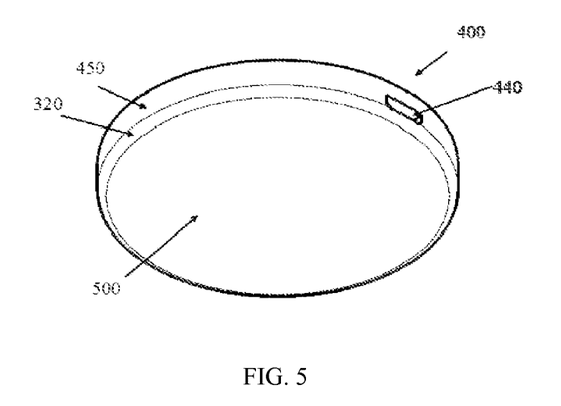
FIG. 5 is a rear view of the battery peripheral of FIG. 4.

FIG. 5 shows a back surface 500 of the battery peripheral 400 of FIG. 4. The back surface is generally flat, and the battery peripheral 400 has a thickness 450 identical to that of the circular outer wall 310 such that the back surface lies flush with the back surface 300 of the case 100 while in use.

As shown, the back surface may contain a slight taper 320 in order to increase the battery capacity while keeping the surfaces substantially flush.

In some embodiments, the thickness 450 of the battery peripheral 400 has a thickness substantially larger than that of circular outer wall 310, such that the battery would stick out when in use, and may be easily removed from the case 100.

Figure 6:
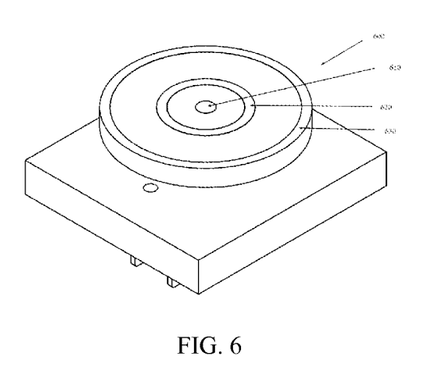
FIG. 6 is a perspective view of a charging mount for use with the case of FIG. 1.

FIG. 6 shows a perspective view of a charging mount 600 for securing to the third port 130 of the case 100. As in the battery peripheral 400, the charging mount 600 may be placed in electrical communication with the conductive segments 140, 150, 160 at conductive segments 610, 620, and 630 on the front surface. In some embodiments, only two conductive segments 610, 620 are electrically connected to two prongs of a power outlet, and the third conductive segment 630 is insulated from the first two conductive segments 610, 620.

Figure 7:
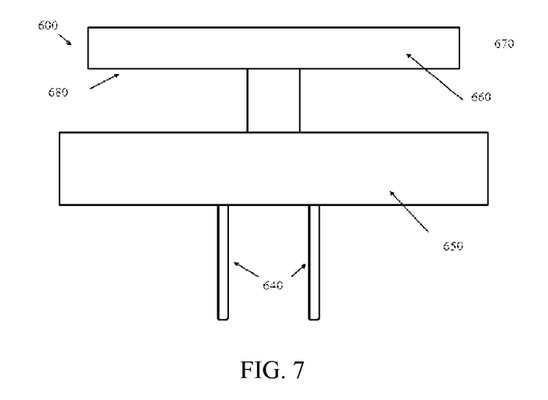
FIG. 7 is a top view of the charging mount of FIG. 6.
Figure 8:
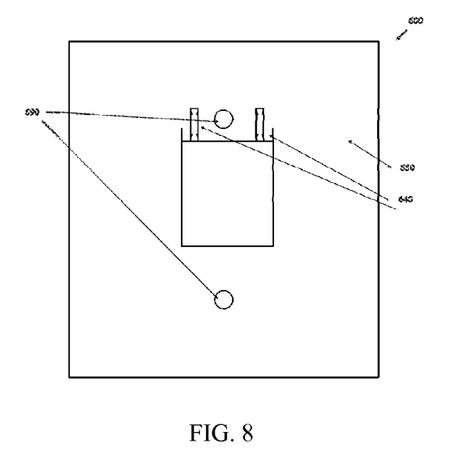
FIG. 8 is a top view of the charging mount of FIG. 6.

FIG. 7 shows a top view and FIG. 8 shows a back view of the charging mount 600 of FIG. 6. The charging mount 600 contains a two pronged power connection 640 for connecting to a standard power supply on a base segment 650, and a disc segment 660 for securing to the third port 130 of the case 100. The disc segment 660 is displaced from the base segment 650, such that the case 100, when fixed to the charging mount 600, is suspended. The disc segment has a thickness 670 substantially similar to the thickness of the circular outer wall 310 such that the back surface 300 of the case 100 lies flush with a back surface 680 of the disc segment 660.

Each prong of the two pronged power connection 640 electrically connects to one of conductive segments 610, 620, and 630. The two pronged connection may be replaced with a different standard connection for a power supply.

The wall mount has screw holes 690 for mounting the charging mount 600 on a wall. The screw holes 690 may be spaced such that the charging mount 600 may be mounted in place of a standard outlet cover over an electric outlet.

Figure 9:
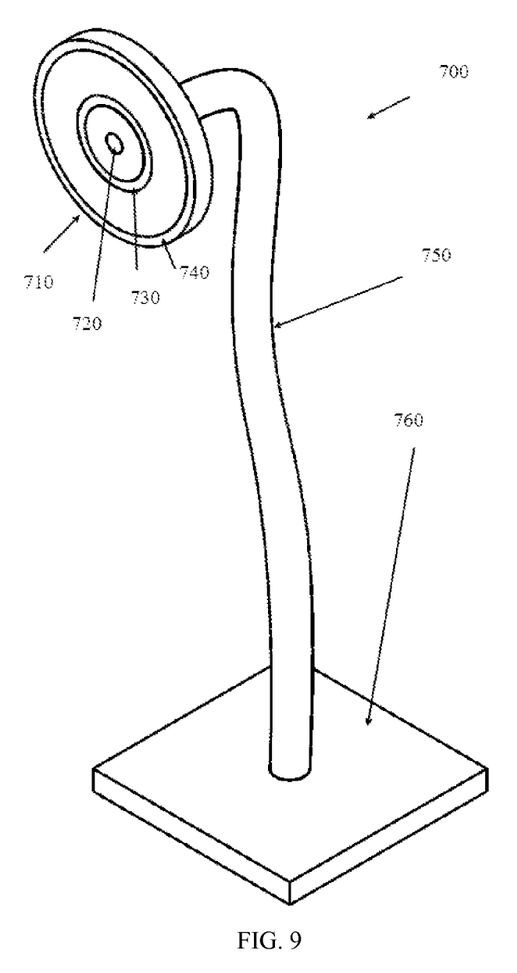
FIG. 9 is a perspective view of a charging stand for use with the case of FIG. 1.

FIG. 9 shows a perspective view of a charging stand 700 having a disc segment 710 similar to the disc segment 660 of charging mount 600. Accordingly, conductive segments 720, 730, and 740 correspond to conductive segments 610, 620, and 630 of charging mount 600, and a two pronged power connection, not shown, is electrically connected to two of the conductive segments.

The disc segment 710 of the charging stand 700 is mounted on a neck 750, which is in turn mounted on a weighted base 760. The weighted base 730 may be placed on a surface, and the neck 750 may be flexible, such that when fixed to the charging stand 700, the case 100 with a mobile phone in it may be repositioned to allow for different viewing heights and angles. The weighted base 760 may be replaced with a different stabilizing element, such as an adjustable clamp for gripping a table edge or any other surface for easy installation of charging stand 700.

Figure 10:
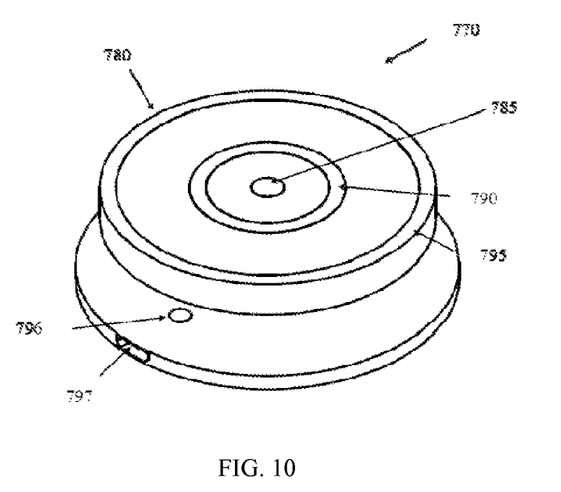
FIG. 10 is a standalone charger for use with the case of FIG. 1.

FIG. 10 shows a standalone charger 770 for securing to the third port 130 of the case 100, which may be provided in addition to or in place of the charging stand 700 and the charging mount 600. Such a charger may have a disc segment 780 that simply corresponds to the disc segments 660, 710 of the other charging peripherals. Accordingly, the conductive segments 785, 790, 795 of such a charger are electrically connected to portions of a power port 797, such as a USB port, a two pronged plug (not shown) or some other standard power connection and connect to the first port of the case 100 through the conductive segments 110, 120 of the case. The standalone charger may have screw holes 796 or some other securement means, for securing to a surface, such as a desk or a wall.

Figure 11:
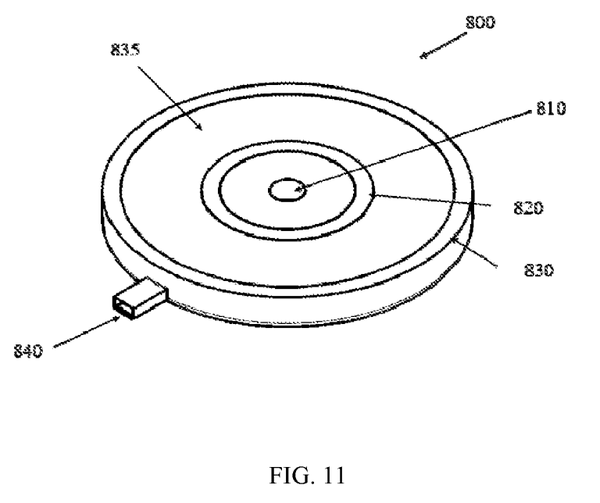
FIG. 11 is a hard drive peripheral for use with the case of FIG. 1.

FIG. 11 shows a perspective view of a hard drive peripheral 800 for securing to the third port 130 of the case 100. The hard drive peripheral 800 provides hard drive storage that may be placed in electrical and data communication with the conductive segments 140, 150, 160 at conductive segments 810, 820, and 830 on the front surface 835. In such an embodiment, one conductive segment 810 provides ground, a second conductive segment 820 provides power, and a third conductive segment 830 provides data. Accordingly, the hard drive may be provided with power from the mobile device, and contains a further contact for transferring data to and from the hard drive. In alternate embodiments, the hard drive may contain a battery for powering itself, and it may have only a single active conductive segment.

As shown, the hard drive peripheral 800 may contain a separate port 840 for communicating with a standardized port, such as a USB port on a computer. Where the hard drive peripheral 800 contains an internal battery, it may be charged using the separate port 840. The hard drive peripheral 800 also has a thickness that is approximately twice the thickness of the circular outer wall 310 of the case 100. This allows for easy removal from the case, while allowing the separate port 840 to lie outside the circular outer wall 310. In alternative embodiments, other sizes and shapes may be used, so long as the conductive segments 810, 820, and 830 on the front surface 835 align with corresponding conductive segments 140, 150, 160.

The hard drive peripheral 800 is configured to connect to a mobile device through the third port 130 of case 100. It will be understood that the case 100 may be for a specific mobile device and the hard drive peripheral 800 may be a generic device configurable to work with any number of mobile devices using distinct APIs. For example, a first case may be provided for a device powered by iOS and a second case may be provided for a device powered by Android OS. Accordingly, the hard drive peripheral 800 contains multiple firmware packages allowing it to connect to mobile devices using different operating systems.

Similarly, other peripherals may contain multiple APIs for allowing the peripheral to interface with different mobile devices.

Figure 12:
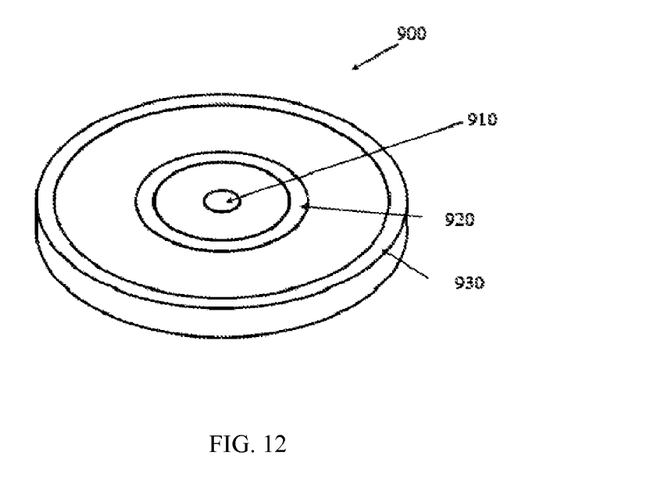
FIG. 12 is a front view of a speaker peripheral for use with the case of FIG. 1.
Figure 13:
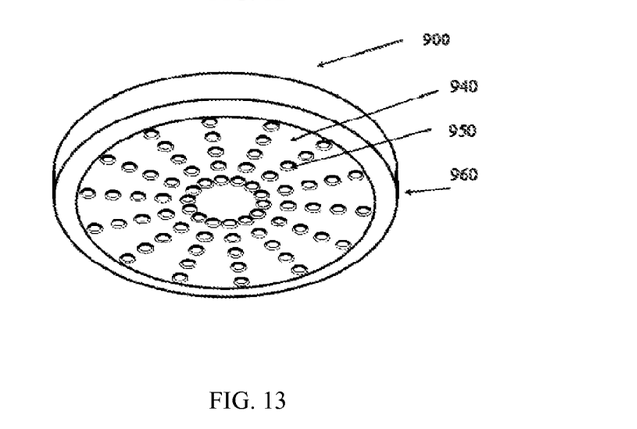
FIG. 13 is a rear view of the speaker peripheral of FIG. 12.

FIG. 12 and FIG. 13 show front and rear views speaker peripheral 900 for securing to the third port 130 of the case 100. The speaker peripheral 900 contains conductive segments 910, 920, 930, that function similarly to those of other peripherals. The speaker peripheral 900 may be powered by either an internal battery, to be charged through a separate power connection (not shown) or may draw power from the first port 110 through the case 100. If the speaker is powered from the first port 110, all three conductive segments 910, 920, 930 are live, with two of them 910, 920 providing power to the speaker peripheral 900 and the third 930 providing signals containing audio. The signals may in the form of data that is processed by the speaker peripheral 900, or it may be in the form of an audio signal that may be provided directly to a speaker cone. Where the speaker is powered by an internal battery, or is unpowered, only a third conductive segment 930 may be live for receiving only the signal containing the audio.

The back surface 940 of the speaker peripheral 900 contains vents 950 for allowing the free flow of air through portions of the peripheral, and for allowing sound out of a peripheral housing 960.

While a number of compatible peripherals have been described at length, it will be understood that addition peripherals are contemplated, such as a camera peripheral (including, for example, a telephoto lens that connect through a secondary port), Near Field Communication (NFC) or other communication protocol adapter, credit card reader, laser measurement devices, and others. In some embodiments, the third port may contain additional conductive segments for connecting with additional ports located on the body of the phone.

Several peripheral devices described above contain back surfaces that may extend from the smartphone when secured to the third port 130. In some embodiments, the back surface may contain a fifth port mirroring the conductive segments 140, 150, 160 from the third port 130 with each of the conductive segments of the fifth port electrically connected to corresponding conductive segments of the third port. For example, multiple peripherals may be connected to a single device such that a battery peripheral 400 may contain a fifth port which may in turn connect to a charging mount 600 or a speaker peripheral 900.

Figure 14:
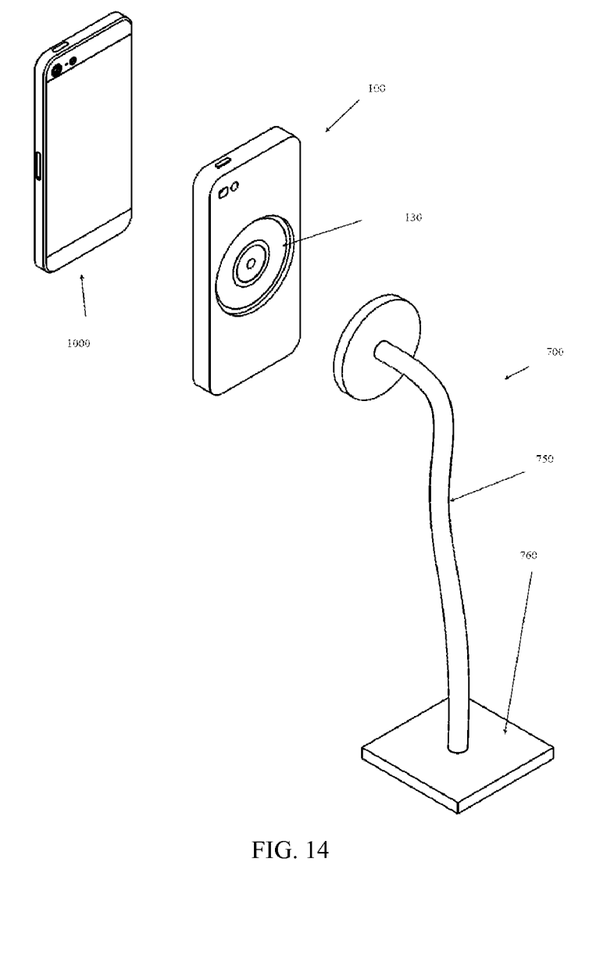
FIG. 14 is an exploded view of a system comprising the case of FIG. 1 and a charging stand of FIG. 9.

FIG. 14 shows an exploded view of a system for connecting peripheral devices to a mobile device having a case, such as the case 100 of FIGS. 1 and 2, and interchangeable peripherals, such as the charging stand 700 of FIGS. 9 and 10. A mobile device, a smart phone 1000 in this case, is shown inserted into the case 100, and the third port 130 of the case is then fixed to the charging stand 700, as described above.

While the present invention has been described at some length and with some particularity with respect to the several described embodiments, it is not intended that it should be limited to any such particulars or embodiments or any particular embodiment, but it is to be construed with references to the appended claims so as to provide the broadest possible interpretation of such claims in view of the prior art and, therefore, to effectively encompass the intended scope of the invention. Furthermore, the foregoing describes the invention in terms of embodiments foreseen by the inventor for which an enabling description was available, notwithstanding that insubstantial modifications of the invention, not presently foreseen, may nonetheless represent equivalents thereto.

What is claimed is:

1. A mobile device case, comprising:
a first port for interfacing with a mobile device;
a second port for interfacing with the mobile device; and
a third port electrically connected to both the first port and the second port,
the third port comprising a first conductive segment and a second conductive segment for interfacing with the first port and the second port respectively;
wherein the first port and the second port are each orthogonal to an axis of the third port.

2. The mobile device case of claim 1 wherein the first port is for power and is electrically connected to the first conductive segment and the second port is for data and is electrically connected to the second conductive segment.

3. The mobile device case of claim 1 wherein the mobile device is a mobile phone, a tablet, a GPS device, or an eBook reader.

4. The mobile device case of claim 1 wherein the third port is recessed into a surface of the mobile device case and contains one or more walls configured for removably fixing a peripheral to the mobile device case.

5. The mobile device case of claim 1 wherein the mobile device case has four walls comprising a top wall, a bottom wall, a left side wall, and a right side wall, and wherein a first interface on the mobile device connects to the case at the first port at a first of the four walls and a second interface on the mobile device connects to the case at the second port at a second of the four walls.

6. The mobile device case of claim 1 wherein the first port and the second port have different orientations.

7. The mobile device case of claim 1 wherein the mobile device case duplicates one of a first interface on the mobile device connected to the case at the first port and a second interface on the mobile device connected to the case at the second port at a location other than the third port.

8. The mobile device case of claim 1 wherein the third port is for interfacing with the mobile device through the first port and the second port.

9. The mobile device case of claim 1 further comprising a fourth port, wherein the third port is connected to the fourth port at a third conductive segment.

10. The mobile device case of claim 1 wherein the third port further comprises a conductive segment for ground.

11. The mobile device case of claim 10 wherein the first conductive segment and the conductive segment for ground connect to the first port and the second conductive segment connects to the second port.

12. The mobile device case of claim 10 wherein the first and second conductive segments are circular and concentric.

13. A system for connecting peripherals to mobile devices, the system comprising:
a mobile device case comprising:
a first port for interfacing with a mobile device;
a second port for interfacing with the mobile device; and
a third port connected to both the first port and the second port,
the third port comprising a first conductive segment and an second conductive segment, and
a first peripheral configured to be removably fixable to the third port,
wherein the first peripheral connects to at least one of the first port and the second port through the first conductive segment and the second conductive segment of the third port;
wherein the first port and the second port are each orthogonal to an axis of the third port.

14. The system of claim 13 wherein the first port is an electrical power interface and wherein the second port is a data interface.

15. The system of claim 13 wherein the first peripheral device uses the first conductive segment and not the second conductive segment, and wherein a second peripheral uses the second conductive segment and not the first conductive segment.

16. The system of claim 13 wherein the first peripheral is a speaker.

17. The system of claim 16 wherein the second port on the mobile device case is for connecting to an audio jack.

18. The system of claim 13 wherein the first peripheral is a hard drive.

19. The system of claim 18 wherein the hard drive contains an application programming interface for allowing use with mobile devices containing different operating systems.

20. The system of claim 13 wherein the first port and the second port of the mobile device case are configured to correspond with a first port and a second port of a particular mobile device, and wherein the third port does not depend on the particular mobile device.

21. The system of claim 20 wherein the first peripheral is configured to connect with the third port of a plurality of mobile device cases configured for different particular mobile devices.

22. The system of claim 13 wherein the mobile device case has a third conductive segment for ground, and the first and second conductive segments are for power and data respectively, and the first peripheral has at least one peripheral conductive segment corresponding to one of the first conductive segment, second conductive segment, and third conductive segment.

23. The system of claim 22 wherein the first peripheral connects to the first port or the second port through the peripheral conductive segment and the corresponding conductive segment of the third port.

24. The system of claim 13 wherein the first peripheral is a spare battery and wherein a second peripheral is connected to the fourth port.

25. The system of claim 24 wherein the second peripheral is a charging stand.

26. The system of claim 25 wherein the second peripheral charges both the first peripheral and a mobile device in the mobile device case.

27. The system of claim 13, wherein the first peripheral is a charging stand.

28. The system of claim 13, wherein the first peripheral is a spare battery.

29. The system of claim 13 wherein the third port is recessed into a surface of the mobile device case and contains one or more walls configured for removably fixing the peripheral to the mobile device case.

30. The system of claim 29 wherein the third port is circular and wherein the first and second conductive segments are circular and concentric.

31. The system of claim 30 wherein the peripheral is rotatable within the third port when removably fixed.

32. The system of claim 13 wherein the mobile device case has four walls comprising a top wall, a bottom wall, a left side wall, and a right side wall, and wherein a first interface on the mobile device connects to the case at a first of the four walls and a second interface on the mobile device connects to the case at a second of the four walls.

33. The system of claim 13 wherein the first port and the second port have different orientations.

34. The system of claim 13 wherein the first port and the second port are each orthogonal to an axis of the third port.

* * * * *